United States Patent
Ide et al.

(10) Patent No.: US 10,727,493 B2
(45) Date of Patent: Jul. 28, 2020

(54) ORIENTED APATITE-TYPE DOPED RARE EARTH SILICATE AND/OR GERMANATE ION CONDUCTOR AND METHOD FOR MANUFACTURING SAME

(71) Applicant: Mitsui Mining & Smelting Co., Ltd., Tokyo (JP)

(72) Inventors: Shingo Ide, Ageo (JP); Yuichi Anno, Ageo (JP); Yasuhisa Izutsu, Ageo (JP); Jun Omura, Ageo (JP); Rintaro Ishii, Ageo (JP); Minoru Kahata, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 101 days.

(21) Appl. No.: 15/542,155

(22) PCT Filed: Dec. 9, 2015

(86) PCT No.: PCT/JP2015/084515
§ 371 (c)(1),
(2) Date: Jul. 7, 2017

(87) PCT Pub. No.: WO2016/111110
PCT Pub. Date: Jul. 14, 2016

(65) Prior Publication Data
US 2018/0183068 A1    Jun. 28, 2018

(30) Foreign Application Priority Data
Jan. 7, 2015    (JP) .................................. 2015-001743

(51) Int. Cl.
*H01M 4/90* (2006.01)
*H01M 8/12* (2016.01)
(Continued)

(52) U.S. Cl.
CPC ........... *H01M 4/9033* (2013.01); *C01B 33/20* (2013.01); *C01B 35/128* (2013.01); *C04B 35/50* (2013.01);
(Continued)

(58) Field of Classification Search
CPC .... H01M 4/9033; H01M 4/8875; H01M 8/02; H01M 8/12; C01B 33/20; C01B 35/128;
(Continued)

(56) References Cited

U.S. PATENT DOCUMENTS

2004/0161651 A1* 8/2004 Higuchi .................. C01B 13/14
                                                      429/535
2013/0052445 A1    2/2013 Nakada et al.

FOREIGN PATENT DOCUMENTS

CN    103241719 A    8/2013
CN    103436967 A    12/2013
(Continued)

OTHER PUBLICATIONS

Najib et al., Doping strategies to optimise the oxide ion conductivity in apatite-type ionic conductors, 2004, Dalton Transactions, 0, 3106-3109 (Year: 2004).*
(Continued)

*Primary Examiner* — Sean P Cullen
(74) *Attorney, Agent, or Firm* — The Webb Law Firm (57) ABSTRACT

In order to provide a novel oriented apatite-type oxide ion conductor which can achieve an increase in area through suppression of crack generation and preferably can be manufactured more inexpensively by an uncomplicated process, an oriented apatite-type oxide ion conductor composed of a composite oxide represented by $A_{9.33+x}[T_{6-y}M_y]O_{26.00+z}$ A in the formula is one kind or two or more kinds of elements selected from the group consisting of La, Ce, Pr, Nd, Sm, Eu, Gd, Tb, Dy, Be, Mg, Ca, Sr, and Ba. T in the
(Continued)

formula is an element including Si, Ge, or both of them. M in the formula is one kind or two or more kinds of elements selected from the group consisting of B, Ge, Zn, Sn, W, and Mo.

9 Claims, 1 Drawing Sheet

(51) Int. Cl.
    *H01B 1/08*     (2006.01)
    *C04B 35/50*     (2006.01)
    *H01M 8/02*     (2016.01)
    *H01B 13/00*     (2006.01)
    *H01B 1/06*     (2006.01)
    *C01B 33/20*     (2006.01)
    *C01B 35/12*     (2006.01)
    *H01M 4/88*     (2006.01)

(52) U.S. Cl.
    CPC .............. *H01B 1/06* (2013.01); *H01B 1/08* (2013.01); *H01B 13/00* (2013.01); *H01M 4/8875* (2013.01); *H01M 8/02* (2013.01); *H01M 8/12* (2013.01); *C01P 2002/30* (2013.01); *C01P 2002/50* (2013.01); *C01P 2004/01* (2013.01); *C01P 2006/40* (2013.01)

(58) Field of Classification Search
    CPC .. C04B 35/50; H01B 1/06; H01B 1/08; H01B 13/00; H01L 31/06; H01L 31/08
    USPC ................................................ 429/495, 528
    See application file for complete search history.

(56) References Cited

FOREIGN PATENT DOCUMENTS

| | | | |
|---|---|---|---|
| CN | 103456967 A | * | 12/2013 |
| EP | 1876269 A1 | | 1/2008 |
| JP | H08208333 A | | 8/1996 |
| JP | H1171169 A | | 3/1999 |
| JP | 2004244282 A | | 9/2004 |
| JP | 2004327210 A | | 11/2004 |
| JP | 2005126269 A | | 5/2005 |
| JP | 2011037662 A | | 2/2011 |
| JP | 2013184862 A | | 9/2013 |
| JP | 2015185321 A | | 10/2015 |
| WO | 2006/118177 A1 | | 11/2006 |

OTHER PUBLICATIONS

Sansom et al., A comparison of the effect of rare earth vs Si site doping on the conductivities of apatite-type rare earth silicates, 2006, Journal of Solid State Electrochemistry, 10, 562-568 (Year: 2006).*
Slater et al., Development of Apatite-Type Oxide Ion Conductors, 2004, The Chemical Record, 4, 373-384 (Year: 2004).*
Fukuda et al., Oxide-Ion Conductivity of Highly c-axis-Oriented Apatite-Type Lanthanum Silicate Polycrystal Formed by Reactive Diffusion between La2SiO5 and La2Si2O7, 2011, Chemistry of Materials, 23, 5474-5483 (Year: 2011).*
Fukuda et al., Combined Effect of Germanium Doping and Grain Alignment on Oxide-Ion Conductivity of Apatite-Type Lanthanum Silicate Polycrystal, 2012, Chemistry of Materials, 24, 2611-2618 (Year: 2012).*
Crystal Structure and Oxide-Ion Conductivity of Highly Grain-Aligned Polycrystalline Lanthanum Germanate Oxyapatite Grown by Reactive Diffusion between Solid La2GeO5 and Gases [GeO + 1/2O2], 2015, Crystal Growth and Design, 15, 3435-3441 (Year: 2015).*
Ueda et al., c-Axis Oriented Apatite-type Silicates as Solid Electrolytes, 2013, ECS Transactions, 57, 1143-1149 (Year: 2013).*
Kendrick et al., Developing apatites for solid oxide fuel cells: insight into structural, transport and doping properties, 2007, Journal of Materials Chemistry, 17, 3104-3111 (Year: 2007).*
Makishima et al., "Formation and Crystallization of Yttrium Aluminosilicate Glasses Containing Calcium Oxide", J. Am. Ceram. Soc., Jun. 1986, pp. C-130-C-131, vol. 69.
Uo et al., "The Effect of Rare-Earth Oxides on the Crystallization of CaO—Al2O3—SiO2 Glasses", Journal of Materials Science, 1998, pp. 749-754, vol. 33.
Mineshige, "Fabrication of an Oriented Glass-Ceramics Electrolyte", Grants-in-Aid for Scientific Research Result Report, May 28, 2010. 16 pages.

* cited by examiner

ORIENTED APATITE-TYPE DOPED RARE EARTH SILICATE AND/OR GERMANATE ION CONDUCTOR AND METHOD FOR MANUFACTURING SAME

CROSS-REFERENCE TO RELATED APPLICATIONS

This application is the United States national phase of International Application No. PCT/JP2015/084515 filed Dec. 9, 2015, and claims priority to Japanese Patent Application No. 2015-001743 filed Jan. 7, 2015, the disclosures of which are hereby incorporated in their entirety by reference.

TECHNICAL FIELD

The present invention relates to an oriented apatite-type oxide ion conductor usable as a solid electrolyte of a battery such as a solid electrolyte fuel cell (SOFC), an ion battery, or an air battery and also as a sensor, a catalyst, a separation membrane, and the like and a method for manufacturing the same.

BACKGROUND ART

Oxide ion conductors are a material which attracts attention as a functional ceramic usable in various electrochemical devices such as solid electrolytes of batteries such as fuel cells (SOFC), ion batteries, and air cells, sensors, and separation membranes.

Hitherto, as oxide ion conductors, Perovskite type oxides such as $LaGaO_3$ and the like have been widely known as well as $ZrO_2$ having a fluorite type structure, in particular, stabilized $ZrO_2$ doped with $Y_2O_3$ has been widely used.

A number of the oxide ion conductors of this type which have hitherto been known are a defect structure type in which an oxygen defect is introduced and an oxygen ion moves through this oxygen defect. In contrast, apatite-type oxide ion conductors such as $La_{10}Si_6O_{27}$ have been recently reported as an oxide ion conductor in which interstitial oxygen moves.

With regard to the apatite-type oxide ion conductor, for example, Patent Document 1 (JP 2004-244282 A) discloses an oxide ion conductor which contains a trivalent element A, a tetravalent element B, and oxygen O as constituent elements, has a composition formula represented by $A_XB_6O_{1.5X+12}$ (where 8≤X≤10), is composed of a composite oxide having an apatite-type crystal structure, and has an anisotropic oxygen ion conductivity.

Among such apatite-type oxide ion conductors, a lanthanum silicate-based oxide ion conductor is known as a solid electrolyte which exhibits high ion conductivity in the intermediate temperature region, and for example, a composition formula of $La_{9.33+x}Si_6O_{26+1.5x}$ or the like attracts attention.

A lanthanum silicate-based oxide ion conductor has an apatite structure exhibiting low symmetry, namely, high anisotropy and low activation energy for ion conduction, and it is thus said to be advantageous particularly for low temperature operation in the case of being used as a solid electrolyte of SOFC.

With regard to the lanthanum silicate-based oxide ion conductor of this type, for example, Patent Document 2 (JP 8-208333 A) discloses an oxide ion conductor which contains $Ln_xSi_6O_{(3X/2)+12}$ (where Ln is a trivalent rare earth element of La, Ce, Pr, Nd, Sm, Eu, Gd, Tb, or Dy, and x is 6<x<12) as the main component and has a crystal system of the main constituent phase of the sintered body calcined at 1300° C. or higher consisting of a hexagonal crystal.

In addition, Patent Document 3 (JP 11-71169 A) discloses an oxide ion conductive ceramic which is a sintered body containing $(RE_2O_3)_x(SiO_2)_6$ (RE is an element selected from La, Ce, Pr, Nd, and Sm, and x satisfies the condition of 3.5<x<6) calcined at a temperature of 1700° C. or higher as the main component and has an apatite crystal structure as the main constituent phase.

However, it is possible to expect to further enhance the ion conductivity through orientation since the lanthanum silicate-based oxide ion conductor exhibits anisotropic ion conductivity.

As a manufacturing method capable of orienting a lanthanum silicate-based oxide ion conductor in one direction, a method to fabricate a single crystal of LSO by a floating zone method (FZ method) or the like or a method which a $La_2O_3$ powder and a $SiO_2$ powder are mixed together and then subjected to a heat treatment at from 700 to 1200° C. to produce a porous material of a composite oxide, this porous material is pulverized into a powder, the powder is then mixed with a dispersion medium to form a slurry, this slurry is solidified in the presence of a magnetic field to form a molded body, this is then sintered at from 1400 to 1800° C., thereby obtaining an ion conductive oriented ceramic in which the orientation directions of crystals are roughly matched has been proposed.

In addition, Patent Document 4 (JP 2011-37662 A) discloses a method for manufacturing an ion conductive oriented ceramic in which first, an oxide raw material containing an oxide powder of a lanthanoid and an oxide powder of at least either of Si or Ge is mixed (oxide raw material mixing step S1), the mixed oxide raw material is then heated and melted to be in a liquid state, this is casted and then rapidly cooled to obtain a glassy material G (melting vitrification step S2), and subsequently the glassy material G is crystallized through a heat treatment at from 800 to 1400° C. (crystallization step S3) in order to provide a method for manufacturing an ion conductive oriented ceramic by which a large one can be easily obtained and ion conductivity can be improved although it requires a low cost and is a simple process.

Furthermore, Patent Document 5 (JP 2013-184862 A) discloses a method to obtain an apatite-type lanthanum silicogermanate polycrystalline substance by heating a bonded body obtained by bonding a first layer containing $La_2Si_2O_7$ as the main component, a second layer containing $La_2[Si_{1-x}Ge_x]O_5$ (where x represents a number in the range of from 0.01 to 0.333) as the main component, and a third layer containing $La_2S_2O_7$ as the main component in the order of the first layer/the second layer/the third layer at a temperature at which element diffusion occurs and removing the layers other than the layer that is positioned at the most intermediate position in the laminated structure generated after heating.

Patent Document 1: JP 2004-244282 A
Patent Document 2: JP 8-208333 A
Patent Document 3: JP 11-71169 A
Patent Document 4: JP 2011-37662 A
Patent Document 5: JP 2013-184862 A

SUMMARY OF THE INVENTION

Problem to be Solved by the Invention

As described above, the apatite-type lanthanum silicate-based oxide ion conductor not only can exert high ion conductivity in the intermediate temperature region but also can exhibit further enhanced ion conductivity by being oriented in one direction since it exhibits anisotropic ion conductivity. However, according to the oriented apatite-type lanthanum silicate-based oxide ion conductor known in the prior art and the manufacturing method thereof, there is a problem that it is difficult to form a large crystal since cracks are generated in the crystal in the course of manufacture or the manufacturing cost increases since the manufacturing process is complicated as a process to form the sintered body into a slurry or a process to apply a magnetic field is required.

Accordingly, an object of the invention is to provide a novel oriented apatite-type oxide ion conductor which can achieve an increase in area through suppression of crack generation and preferably can be manufactured more inexpensively by an uncomplicated process and a method for manufacturing the same.

SUMMARY OF THE INVENTION

The invention proposes an oriented apatite-type oxide ion conductor composed of a composite oxide represented by $A_{9.33+x}[T_{6-y}M_y]O_{26.00+z}$ (A in the formula is one kind or two or more kinds of elements selected from the group consisting of La, Ce, Pr, Nd, Sm, Eu, Gd, Tb, Dy, Be, Mg, Ca, Sr, and Ba. T in the formula is an element including Si, Ge, or both of them. M in the formula is one kind or two or more kinds of elements selected from the group consisting of B, Ge, Zn, Sn, W, and Mo.), in which x in the formula is from −1 to 1, y in the formula is from 1 to 3, z in the formula is from −2 to 2, and a ratio (A/M) of the number of moles of A to the number of moles of M is from 3 to 10.

The invention also proposes a method for manufacturing an oriented apatite-type oxide ion conductor which includes a step (referred to as the "vapor phase-solid phase diffusion step") of converting a precursor represented by $A_{2+x}TO_{5+z}$ (A in the formula is one kind or two or more kinds of elements selected from the group consisting of La, Ce, Pr, Nd, Sm, Eu, Gd, Tb, Dy, Be, Mg, Ca, Sr, and Ba. T in the formula is an element including Si, Ge, or both of them. In the formula, x is from −1 to 1 and z is from −2 to 2.) to have an apatite structure and orienting the precursor in one direction by heating the precursor in a gas phase containing an element M (M is one kind or two or more kinds of elements selected from the group consisting of B, Ge, Zn, Sn, W, and Mo) for a reaction of the precursor with the element M.

The oriented apatite-type oxide ion conductor proposed by the invention not only can be oriented in one direction but also can exhibit enhanced ion conductivity. Hence, the oxide ion conductor proposed by the invention can be suitably used as a solid electrolyte, a separation membrane, or the like, in particular as a solid electrolyte of a battery such as a fuel cell (SOFC), an ion battery, or an air battery.

In addition, according to the method for manufacturing an oriented apatite-type oxide ion conductor proposed by the invention, it is possible to easily and inexpensively manufacture an oriented crystal. In addition, it is possible to achieve an increase in area of the oriented apatite-type oxide ion conductor since the method suppresses the generation of cracks and the like as well as can orient the crystal in one direction.

DETAILED DESCRIPTION AND MODE(S) FOR CARRYING OUT THE INVENTION

Figure 1:
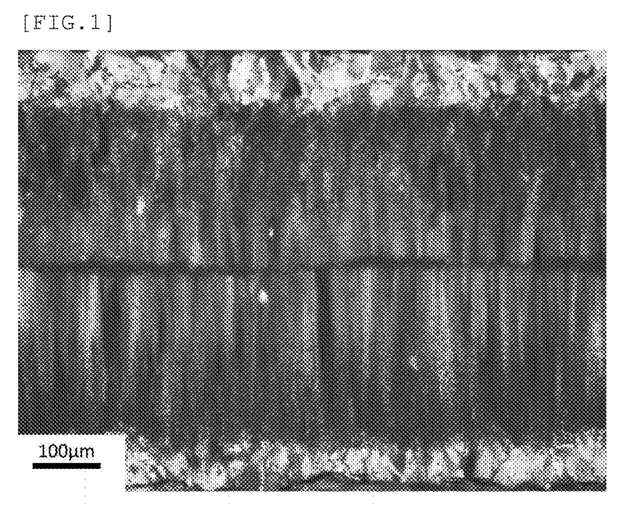
FIG. 1 is a photograph of the cross section of the apatite-type sintered body (sample) obtained in Example 1 taken by a polarizing microscope.
Figure 2:
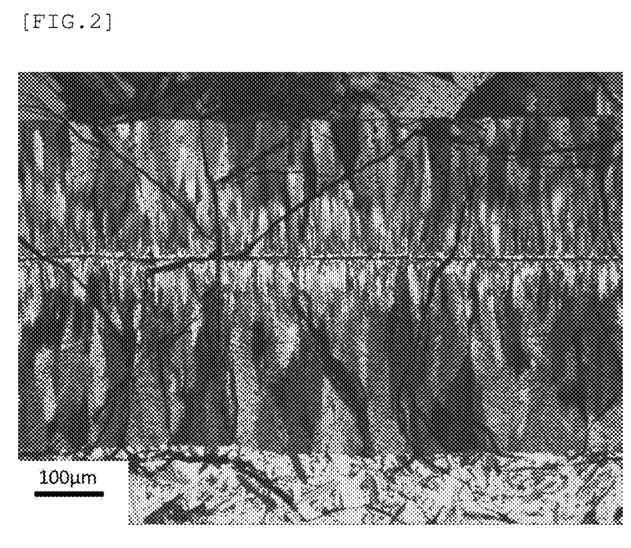
FIG. 2 is a photograph of a cross section of the apatite-type sintered body (sample) obtained in Comparative Example 3 taken by a polarizing microscope.

Next, the invention will be described based on embodiments. However, the invention is not limited to the embodiments to be described below.

<Present Oxide Ion Conductor>

The oxide ion conductor (referred to as the "present oxide ion conductor") according to an example of the present embodiment is an oriented apatite-type oxide ion conductor composed of a composite oxide (referred to as the "present apatite-type composite oxide") which has an apatite-type structure and is represented by Formula (1): $A_{9.33+x}[T_{6-y}M_y]O_{26.00+z}$ (A in the formula is one kind or two or more kinds of elements selected from the group consisting of La, Ce, Pr, Nd, Sm, Eu, Gd, Tb, Dy, Be, Mg, Ca, Sr, and Ba. T in the formula is an element including Si, Ge, or both of them. M in the formula is one kind or two or more kinds of elements selected from the group consisting of B, Ge, Zn, Sn, W, and Mo.), in which x in the formula is from −1 to 1, y in the formula is from 1 to 3, z in the formula is from −2 to 2, and a ratio (A/M) of the number of moles of A to the number of moles of M is from 3 to 10.

Incidentally, the "orientation" of the oriented apatite-type oxide ion conductor means that the oriented apatite-type oxide ion conductor has an orientation axis and the orientation includes uniaxial orientation and biaxial orientation. In the present apatite-type composite oxide, it is preferable to have c-axis orientation.

La, Ce, Pr, Nd, Sm, Eu, Gd, Tb, Dy, Be, Mg, Ca, Sr, and Ba which are listed as A in Formula (1) are elements having a common point of being lanthanoids or alkaline earth metals which become ions having a positive charge and can constitute an apatite-type hexagonal structure. Among these, from the viewpoint of further increasing the oxygen ion conductivity, A is preferably a combination with one kind or two or more kinds of elements selected from the group consisting of La, Nd, Ba, Sr, Ca, and Ce, among them, A is preferably one kind between La and Nd or a combination of La with one kind or two or more kinds of elements selected from the group consisting of Nd, Ba, Sr, Ca, and Ce.

In addition, T in Formula (1) may be an element including Si, Ge, or both of them.

The element M in Formula (1) is introduced by a reaction with a metastable precursor ($A_{2+x}TO_{5+z}$ to be described later) in the gas phase, and as a result, it is possible to orient the crystal in one direction as well as to change the precursor to have an apatite structure.

From such a viewpoint, the element M may be any element as long as it can form a gas phase at a temperature of 1,000° C. or higher at which the precursor is converted to have an apatite structure and can obtain a required vapor pressure. Incidentally, the "required vapor pressure" means a vapor pressure at which the element M can move in the atmosphere in a gas phase state and advance the reaction through grain boundary diffusion or intraparticle diffusion from the surface toward the inside of the precursor.

Hence, examples of the element M may include one kind or two or more kinds of elements selected from the group consisting of B, Ge, Zn, W, Sn, and Mo from such a viewpoint. Among them, B, Ge, Zn, and the like are particularly preferable from the viewpoint of a high degree of orientation and high productivity (orientation speed).

In Formula (1): $A_{9.33+x}[T_{6-y}M_y]O_{26.00+z}$, x is preferably from −1 to 1 from the viewpoint of increasing the degree of orientation and oxygen ion conductivity, it is preferably 0.00 or more or 0.70 or less among them, and it is preferably 0.45 or more or 0.65 or less among them.

From the viewpoint of filling up the position of the element T in the apatite-type crystal lattice, y in Formula (1) is preferably from 1 to 3, it is preferably 1 or more or 2 or less among them, and it is preferably 1.00 or more or 1.62 or less among them.

From the viewpoint of keeping the electrical neutrality in the apatite-type crystal lattice, z in Formula (1) is preferably from −2 to 2, it is preferably −1.5 or more or 1.5 or less among them, and it is preferably −1 or more or 1 or less among them.

In addition, in Formula (1), the ratio (A/M) of the number of moles of A to the number of moles of M, namely, (9.33+x)/y in Formula (1) is preferably from 3 to 10 from the viewpoint of keeping the spatial occupation ratio in the apatite-type crystal lattice, it is preferably 6.2 or more or 9.2 or less among them, and it is preferably 7 or more or 9 or less among them.

Specific examples of Formula (1): $A_{9.33+x}[T_{6-y}M_y]O_{26.00+z}$ may include $La_{9.33+x}[Si_{4.7}B_{1.3}]O_{26.00+z}$, $La_{9.33+x}[Si_{4.7}Ge_{1.3}]O_{26.00+z}$, $La_{9.33+x}[Si_{4.7}Zn_{1.3}]O_{26.00+z}$, $La_{9.33+x}[Si_{4.7}W_{1.3}]O_{26.00+z}$, $La_{9.33+x}[Si_{4.7}Sn_{1.3}]O_{26.00+z}$, and $La_{9.33+x}[Ge_{4.7}B_{1.3}]O_{26.00+z}$. However, it is not limited to these.

The present apatite-type composite oxide can have the degree of orientation measured by the Lotgering method, namely, the degree of Lotgering orientation of 0.6 or more, it can have the degree of orientation of 0.8 or more among them, and particularly it can have the degree of orientation of 0.9 or more among them.

In order to have the degree of Lotgering orientation of the present apatite-type composite oxide of 0.6 or more, it is preferable to prepare the precursor represented by $A_{2+x}TO_{5+z}$ in a single phase and at a high density (relative density of 80% or more). However, it is not limited to such a method.

The present apatite-type composite oxide can have the oxygen ion conductivity of $10^{-4}$ S/cm or more at 500° C., it can have the oxygen ion conductivity of $10^{-3}$ S/cm or more among them, and particularly it can have the oxygen ion conductivity of $10^{-2}$ S/cm or more among them.

In order to have the oxygen ion conductivity of the present apatite-type composite oxide at 500° C. of $10^{-4}$ S/cm or more, it is preferable to have the degree of Lotgering orientation of 0.6 or more. However, it is not limited to such a method.

The present apatite-type composite oxide can have a transportation number of 0.8 or more, it can have a transportation number of 0.9 or more among them, and particularly it can have a transportation number of 0.95 or more among them.

In order to have the transportation number of the present apatite-type composite oxide of 0.8 or more, it is preferable to have the purity of $A_{9.33+x}[T_{6-y}M_y]O_{26.00+z}$ of 90% or more. However, it is not limited to such a method.

<Method for Manufacturing Oxide Ion Conductor>

The method for manufacturing an oxide ion conductor according to an example of the present embodiment (referred to as the "present manufacturing method") is a manufacturing method including a step (referred to as the "vapor phase-solid phase diffusion step") of converting a precursor represented by Formula (2): $A_{2+x}TO_{5+z}$ (A in the formula is one kind or two or more kinds of elements selected from the group consisting of La, Ce, Pr, Nd, Sm, Eu, Gd, Tb, Dy, Be, Mg, Ca, Sr, and Ba. T in the formula is an element including Si, Ge, or both of them. In the formula, x is from −1 to 1 and z is from −2 to 2.) to have an apatite structure by heating the precursor in a gas phase containing an element M (M is one kind or two or more kinds of elements selected from the group consisting of B, Ge, Zn, Sn, W, and Mo) for a reaction of the precursor with the element M.

It is arbitrary to add other steps as long as the present manufacturing method includes a gas phase-solid phase diffusion step.

According to the present manufacturing method, it is possible not only to obtain an oxide ion conductor having an apatite-type structure in which crystals are oriented in one direction but also to manufacture an oriented apatite-type oxide ion conductor having a larger area since the generation of cracks and the like in the crystal can be suppressed.

An oriented apatite composite oxide starts to be formed as the element M (cation) in the gas phase reacts with the precursor from the surface of the precursor and the entire precursor can be converted into an oriented apatite composite oxide as the reaction of the precursor with the apatite phase thus generated proceeds at the interface.

Hence, the present oxide ion conductor can be manufactured by the present manufacturing method. However, the oxide ion conductor that can be manufactured by the present manufacturing method is not limited to the present oxide ion conductor described above.

(Precursor)

The precursor in the present manufacturing method may be a compound represented by Formula (2) described above, and it may be a non-oriented one.

The precursor may be, for example, a sintered body, a molded body, or a film.

The precursor may be, for example, a compound obtained by a wet synthesis method such as a sol-gel method or a hydrothermal synthesis method using a compound containing the elements A and T of the target as a raw material, it may be a compound obtained by sintering a compound containing the elements A and T, or it may be a film formed by sputtering or the like.

Among them, the sintered body of the precursor may be, for example, a composite oxide sintered body obtained by mixing and heating two or more kinds of oxides by a solid phase method, a green compact obtained by pressure-molding a powder obtained by pulverizing the sintered body, or further one prepared as a sintered body (referred to as the "composite oxide green compact sintered body") obtained by heating and sintering the green compact.

Among them, from the viewpoint of the density of the final oriented apatite-type oxide ion conductor, the sintered body of the precursor is preferably the composite oxide green compact sintered body, it is particularly preferably a green compact sintered body obtained by heating and sintering a green compact formed through pressure molding by cold isostatic pressing (CIP) among them, and it is even preferably one obtained by polishing the surface of the green compact sintered body.

Incidentally, as a method for preparing the precursor, it is preferable to heat and sinter the raw material at from 1100° C. to 1700° C. in the atmospheric air for sintering, among them, it is more preferable to heat a mixture of compounds containing A and T to be the raw material at from 1200° C. to 1700° C. in the atmospheric air and then to heat the green compact again at from 1300° C. to 1700° C. in the atmospheric air for sintering. As the role of each calcination when conducting the calcination two times in this manner, the first calcination mainly plays a role to synthesize a composite oxide and the second calcination mainly plays a role to sinter the composite oxide.

The amount of element M to be doped from the gas phase is determined by the composition ratio of the precursor. Hence, the amount of element M in apatite-type silicate, germinate, or silicogermanate fabricated by a vapor phase method, namely, the apatite-type composite oxide described above depends on the composition ratio of the precursor.

From such a viewpoint, x in Formula (2) is preferably from −1 to 1, it is preferably −0.4 or more or 0.7 or less among them, and it is preferably 0 or more or 0.6 or less among them.

From the viewpoint keeping the electrical neutrality in the precursor crystal lattice and chemically holding the crystal structure, z in Formula (2) is preferably from −2 to 2, it is preferably −0.6 or more or 1 or less among them, and it is preferably 0 or more or 0.7 or less among them.

Specific composition examples of the precursor may include $La_2SiO_5$, $Nd_2SiO_5$, $LaNdSiO_5$, and $La_2GeO_5$. However, it is not limited to these.

(Gas Phase-Solid Phase Diffusion Step)

The gas phase-solid phase diffusion step in the present manufacturing method is characterized by the fact that the oriented crystal grows from the gas phase-solid phase interface. The element M is introduced from the gas phase and an oriented sintered body having a target composition can be obtained.

At this time, the crystal is oriented in the course that the element M in the gas phase penetrates into the crystal via the surface of the precursor. Hence, it is possible to control the orientation direction by masking a part of the surface of the precursor green compact sintered body.

The element M may be any element which becomes a vapor phase at 1000° C. or higher at which the precursor changes to have an apatite-type crystal structure and can obtain a required vapor pressure. Here, the "required vapor pressure" means a vapor pressure at which the element M can move in the atmosphere in a gas phase state and advance the reaction through grain boundary diffusion or intraparticle diffusion from the surface toward the inside of the precursor.

From such a viewpoint, examples of the element M may include one kind or two or more kinds of elements selected from the group consisting of B, Ge, Zn, W, Sn, and Mo. These make it possible to obtain a sintered body having an oriented apatite structure in which the element M is introduced into the site T by the reaction of the element M in the gas phase with the precursor surface.

Examples of the compound containing the element M may include $B_2O_3$, $H_3BO_3$, $LaBO_3$, and $LaB_6$, for example, in a case in which the element M is B. Amorphous materials such as borosilicate glass can also be used.

Meanwhile, examples of the compound containing the element M may include ZnO, Zn metal, and $Zn_2SiO_4$ in a case in which the element M is Zn, examples thereof may include $GeO_2$ and Ge metal in the case of Ge, examples thereof may include $WO_3$, $WO_2$, and W metal in the case of W, examples thereof may include $SnO_2$, SnO, and Sn metal in the case of Sn, and examples thereof may include $MoO_2$, $MOO_3$, $MoSi_2$, and Mo metal in the case of Mo.

The gas phase containing the element M may contain any of an ion containing the element M, a vapor containing the element M, a gas containing the element M, and the like. For example, it may be a gas phase containing a vapor containing the element M and oxygen.

Hence, the heating atmosphere at this time, namely, the atmosphere in the container containing the element M may be any of an atmospheric atmosphere, a vacuum state, an oxidizing atmosphere, a reducing atmosphere, and an inert atmosphere.

As a specific method for heating the precursor in the gas phase containing the element M in the gas phase-solid phase diffusion step, for example, a compound containing the element M may be vaporized by placing the precursor represented by $A_{2+x}TO_{5+z}$ and the compound containing the element M in a container, for example, a closed container or a container with a lid and heating them to change the atmosphere in the container to a gas phase atmosphere containing the element M and the element M may be reacted with the surface of the precursor. However, it is not limited to such a method.

Incidentally, the "container" in the gas phase-solid phase diffusion step means an article which limits the space required to obtain the "required vapor pressure" described above, and examples thereof may include a reaction tube, a chamber, and a sagger with a lid. However, it is not limited to these.

More specifically, a $B_2O_3$ powder is vaporized by placing the sintered body having a composition of $La_2SiO_5$ and the $B_2O_3$ powder in the same alumina container with a lid and heating them at from 1200 to 1600° C. to change the atmosphere in the container to a gas phase atmosphere containing the element B and a c-axis oriented apatite $La_{90.33+x}(Si_{4.7}B_{1.3})O_{26.00+z}$ in which the site Si is substituted with B can be then synthesized.

The heating temperature (set temperature of the furnace) in the gas phase-solid phase diffusion step is preferably 1000° C. or higher, it is preferably 1100° C. or higher among them, and it is particularly preferably 1200° C. or higher among them. The upper limit of the heating temperature is not particularly limited, but it is understood that the upper limit temperature is approximately 1700° C. at which the crystal structure of the apatite-type composite oxide can be maintained.

<Application>

As an example of the usage form of the present oxide ion conductor, a usage form as a solid electrolyte of an electrode bonded body having a configuration in which an electrode is laminated on both surfaces of the present oxide ion conductor can be mentioned. The shape of the present oxide ion conductor is not limited. For example, it may be a form such as a cylindrical shape in addition to a flat film shape. For example, in a case in which the present oxide ion conductor has a cylindrical shape, the electrode is usually laminated on the inner peripheral surface and outer peripheral surface of the present oxide ion conductor.

In the case of using such an electrode bonded body using the present oxide ion conductor as the cell of a fuel cell (SOFC), the oxygen atom which has received an electron at the cathode electrode become an $O^{2-}$ ion, the $O^{2-}$ ion reaches the anode electrode via the solid electrolyte and chemically bonds with hydrogen here to release the electron so that electricity can be generated, for example, when a fuel gas is supplied to the anode electrode of the electrode bonded body, an oxidant (air, oxygen, or the like) is supplied to the cathode electrode, and the electrode bonded body is operated at from 350 to 1000° C.

Meanwhile, in the case of using such an electrode bonded body using the present oxide ion conductor as an oxygen sensor, an electromotive force is generated in accordance with the oxygen concentration in the measurement atmosphere, for example, when one side of the electrode bonded body is exposed to the reference gas and the opposite side thereof is exposed to the measurement atmosphere. Hence, the electrode bonded body can be utilized for controlling the air-fuel ratio of the exhaust gas, for example, by using the atmospheric air as the reference gas and the exhaust gas from the internal combustion engine as the measurement atmosphere.

In addition, in the case of using such an electrode bonded body using the present oxide ion conductor as an oxygen separating membrane, the oxygen atom which has received an electron at the cathode electrode become an $O^{2-}$ ion, the $O^{2-}$ ion reaches the anode electrode via the solid electrolyte and releases the electron here to chemically bond with another $O^{2-}$ ion so that only an oxygen molecule can be transmitted when air is supplied to the cathode electrode and the electrode bonded body is operated at from 350 to 1000° C. in the same manner as in the case of using the electrode bonded body as the cell of a fuel cell (SOFC)

In these applications, from the viewpoint of suppressing the electric resistance and the manufacturing stability, the thickness of the present oxide ion conductor is preferably from 0.01 μm to 1000 μm, and it is more preferably 0.1 μm or more or 500 μm or less among them. Incidentally, the electrode to be used in the applications described above is preferably in a porous form. As the material for the electrode, those known in the applications can be appropriately utilized, and the thickness thereof is preferably about from 0.01 to 70 μm.

<Explanation of Words and Phrases>

In the present specification, in the case of being expressed as "X to Y" (X and Y are arbitrary numbers), it includes the meaning of being "preferably greater than X" or "preferably smaller than Y" together with the meaning of being "X or more and Y or less" unless otherwise stated.

In addition, in the case of being expressed as "X or more" (X is an arbitrary number) or "Y or less" (Y is an arbitrary number), it also includes the intention to be "preferably greater than X" or "preferably less than Y".

EXAMPLES

Hereinafter, the invention will be described in more detail based on the following Examples and Comparative Examples.

Example 1

$La_2O_3$ and $SiO_2$ are blended in a molar ratio of 1:1, ethanol is added thereto, and they were mixed together by using a ball mill, and this mixture was dried, pulverized by using a mortar, and calcined for 3 hours at 1650° C. in an atmospheric atmosphere by using a Pt crucible. Subsequently, ethanol was added to this calcined product, and the calcined product was pulverized by using a planetary ball mill, thereby obtaining a preliminarily calcined body powder.

Next, the preliminarily calcined body powder was placed in a molding machine having a diameter of 20 mm, and uniaxially molded by applying a pressure thereto from one direction, and the molded body was then further subjected to cold isostatic pressing (CIP) for 1 minute at 600 MPa to be molded into a pellet. Subsequently, this pellet-shaped molded body was heated for 3 hours at 1600° C. in the atmospheric air to obtain a pellet-shaped sintered body, and the surface of the pellet-shaped sintered body thus obtained was polished with a diamond grindstone, thereby obtaining a precursor.

It has been confirmed that the precursor thus obtained has a structure of $La_2SiO_5$ from the results for the powder X-ray diffraction and chemical analysis thereof.

In a sagger with a lid, 800 mg of the precursor (pellet) thus obtained and 140 mg of a $B_2O_3$ powder were placed, heated for 50 hours at 1550° C. (atmosphere temperature in the furnace) in the atmospheric air by using an electric furnace to react the $B_2O_3$ vapor with the precursor at the same time as well as to generate $B_2O_3$ vapor in the sagger. The surface of the pellet thus obtained was polished with waterproof abrasive paper No. 1200, thereby obtaining an apatite-type sintered body (sample).

Examples 2 to 6

In the fabrication of the precursor of Example 1, the precursor ($A_{2+x}TO_{5+z}$) presented in Table 1 was fabricated by changing the molar ratio of $La_2O_3$ to $SiO_2$, and an apatite-type sintered body (sample) was obtained in the same manner as in Example 1 by using this.

Incidentally, it has been confirmed that the precursor thus obtained has the composition presented in Table 1 from the results for the powder X-ray diffraction and chemical analysis thereof.

Examples 7 and 8

In Example 7, a precursor ($A_{2+x}TO_{5+z}$) and an apatite-type sintered body (sample) were fabricated in the same manner as in Example 1 above except that $GeO_2$ was used instead of $SiO_2$ and the calcination time of the precursor ($A_{2+x}TO_{5+z}$) was 50 hours.

Meanwhile, in Example 8, a precursor ($A_{2+x}TO_{5+z}$) and an apatite-type sintered body (sample) were fabricated in the same manner as in Example 1 above except that $GeO_2$ was used together with $SiO_2$.

Examples 9 to 13

A precursor ($A_{2+x}TO_{5+z}$) and an apatite-type sintered body (sample) were fabricated in the same manner as in Example 1 above except that $GeO_2$, $ZnO$, $WO_3$, or $SnO_2$ was used instead of a $B_2O_3$ powder and also the calcination temperature was changed to 1500° C. in the case of ZnO, and the calcination temperature was changed to 1400° C. in the case of $SnO_2$ or $WO_3$.

Incidentally, a precursor ($A_{2+x}TO_{5+z}$) and an apatite-type sintered body (sample) of Example 13 were fabricated in the same manner as in Example 1 except that $MoO_3$ and was placed in a sagger with a lid together with a $B_2O_3$ powder and the calcination was conducted.

Example 14

A precursor ($A_{2+x}TO_{5+z}$) and an apatite-type sintered body (sample) were fabricated in the same manner as in Example 1 except that $Nd_2O_3$ was used instead of $La_2O_3$ in the fabrication of the precursor of Example 1.

Examples 15 to 20

A precursor ($A_{2+x}TO_{5+z}$) and an apatite-type sintered body (sample) were fabricated in the same manner as in Example 1 except that $Nd_2O_3$, $BaCO_3$, $SrCO_3$, $CaCO_3$, or $CeO_2$ was respectively used together with $La_2O_3$.

Incidentally, it has been confirmed that the precursor thus obtained has the composition presented in Table 1 from the results for the powder X-ray diffraction and chemical analysis thereof.

The apatite-type sintered bodies (samples) obtained in Examples 1 to 20 were subjected to the powder X-ray diffraction and chemical analysis, and as a result, it has been confirmed that all the apatite-type sintered bodies (samples) of Examples have an apatite crystal structure in which the space group of the main constituent phase thereof belongs to P6$_3$/m and the compositions presented in Table 1.

In addition, all the apatite-type sintered bodies (samples) of Examples were observed through a polarizing microscope and a scanning electron microscope, and as a result, cracks were not recognized.

Incidentally, the apatite structure is stable in the high temperature region even when elements such as Ce, Pr, Sm, Eu, Gd, Tb, Dy, Be, Mg, Ca, Sr, and Ba are used instead of La in Examples 1 to 20, and it can be thus expected that it is possible to fabricate an apatite-type sintered body in the same manner as the case of using La and to obtain the same effect as that in Examples described above.

Comparative Example 1

A precursor was fabricated in the same manner as in Example 1 and heated for 50 hours at 1550° C. (atmosphere temperature in the furnace) in the atmospheric air without putting a compound containing the element M. The results for the powder X-ray diffraction and chemical analysis reveals that the sintered body thus obtained has a structure of La$_2$SiO$_5$ but an apatite-type crystal structure is not obtained.

Comparative Example 2

La$_2$O$_3$ and SiO$_2$ were mixed in a molar ratio of 4.83:6, and the mixture was calcined for 3 hours at 1600° C. in the atmospheric air to obtain a synthetic powder having a composition of La$_{9.66}$Si$_6$O$_{26.49}$. The powder thus obtained was pulverized by using a planetary ball mill, placed in a molding machine of having a diameter of 20 mm, and molded into a pellet shape by applying a pressure thereto from one direction, and the molded body was then further subjected to cold isostatic pressing (CIP) for 1 minute at 600 MPa to obtain a molded body. This molded body was heated for 3 hours at 1600° C. in the atmospheric air to obtain an apatite-type sintered body (sample).

Comparative Example 3

La$_2$O$_3$ and SiO$_2$ were mixed in a molar ratio of 1:1, and the mixture was calcined for 3 hours at 1600° C. in the atmospheric air to obtain a synthetic powder having a composition of La$_2$SiO$_5$. In addition, La$_2$O$_3$ and SiO$_2$ were mixed in a molar ratio of 1:2, and the mixture was calcined for 3 hours at 1600° C. in the atmospheric air to obtain a synthetic powder having a composition of La$_2$Si$_2$O$_7$ in the same manner. Each of the two kinds of synthetic powders thus obtained was pulverized by using a planetary ball mill, these were placed in a molding machine having a diameter of 20 mm in the order of La$_2$SiO$_5$(0.5 g)/La$_2$Si$_2$O$_7$(0.35 g)/La$_2$SiO$_5$(0.5 g) and molded into a pellet shape in a state in which three layers were laminated by applying a pressure thereto from one direction, and the molded body was then further subjected to cold isostatic pressing (CIP) for 1 minute at 600 MPa to obtain a molded body. This molded body was heated for 100 hours at 1600° C. in the atmospheric air to obtain a calcined body having an oriented apatite layer utilizing element diffusion.

Both surfaces of this calcined body were ground with a diamond grindstone to take out the oriented apatite layer generated at the center in the thickness direction, thereby obtaining an apatite-type sintered body (sample).

Comparative Example 4

La$_2$O$_3$ and SiO$_2$ were mixed in a molar ratio of 4.83:6, and the mixture was calcined for 3 hours at 1500° C. in the atmospheric air to obtain a synthetic powder having a composition of La$_{9.66}$Si$_6$O$_{26.49}$. The powder thus obtained was pulverized by using a planetary ball mill and put in a dispersion medium to which a dispersant had been added to form a slurry. The slurry thus fabricated was solidified by a cast molding method while applying a strong magnetic field of 10 T thereto. This molded body was heated for 10 hours at 1600° C. in the atmospheric air to obtain an apatite-type sintered body (sample).

<Method for Measuring Degree of Orientation>

The degree of orientation was calculated by the Lotgering method using the following formula. The degree of orientation f was calculated by the following formula (1) using the ratio ρ between the sum total of all peak intensities obtained from bulk X-ray diffraction of the apatite-type sintered body and the sum of both peak intensities attributed to (002) and (004).

$$f=(\rho-\rho_0)/(1-\rho_0) \quad (1)$$

where, $\rho_0$: theoretical value of apatite structure crystal $$\rho_0=\Sigma I_0(00l)/\Sigma I_0(hkl)$$

ρ: measured value for oriented apatite sintered body $$\rho=\Sigma I(00l)/\Sigma I(hkl)$$

<Method for Measuring Transportation Number>

The transportation number was calculated by fabricating an oxygen concentration cell (oxygen concentration 1.0%/21.0%) and measuring the electromotive force. The electromotive force of a cell using a silver paste as an electrode was measured at from 900° C. to 400° C., and the ratio between the theoretical electromotive force value at each temperature calculated from the oxygen concentration and the measured value for the cell using the apatite-type sintered body thus obtained was adopted as the transportation number.

<Measurement of Oxygen Ion Conductivity>

A platinum film having a thickness of 150 nm was formed on both surfaces of the apatite-type sintered body (sample) by a sputtering method to form an electrode, and then subjected to the complex impedance analysis at a frequency of from 0.1 Hz to 32 MHz using an impedance measuring device by changing the temperature in the heating furnace. For each apatite-type sintered body (sample), the oxygen ion conductivity (S/cm) was determined from the total resistance component (intragranular resistance+grain boundary resistance), and the oxygen ion conductivity at 500° C. is presented in the following Table 1.

<Comprehensive Evaluation>

The presence or absence of crack generation and the physical property values measured above were comprehensively evaluated on the basis of the following criteria.

◉ (very good): in a case in which conductivity is $1.0 \times 10^{-2}$ or more, degree of orientation is 90 or more, and cracks are not generated.

○ (good): in a case in which conductivity is $1.0 \times 10^{-4}$ or more, degree of orientation is 60 or more, and cracks are not generated.

Δ (usual): in a case in which conductivity is $1.0 \times 10^{-5}$ or more and cracks are not generated.

× (poor): in a case in which cracks are generated.

TABLE 1

| | $A_{2+x}TO_{5+z}$ | | | | | | | | | |
|---|---|---|---|---|---|---|---|---|---|---|
| | A | | | T | | | | O | x | z |
| Example 1 | La | 2.01 | | Si | 1.00 | | | O | 5.02 | 0.01 | 0.02 |
| Example 2 | La | 2.03 | | Si | 1.00 | | | O | 5.05 | 0.03 | 0.05 |
| Example 3 | La | 2.07 | | Si | 1.00 | | | O | 5.11 | 0.07 | 0.11 |
| Example 4 | La | 2.31 | | Si | 1.00 | | | O | 5.47 | 0.31 | 0.47 |
| Example 5 | La | 2.42 | | Si | 1.00 | | | O | 5.63 | 0.42 | 0.63 |
| Example 6 | La | 2.64 | | Si | 1.00 | | | O | 5.96 | 0.64 | 0.96 |
| Example 7 | La | 2.10 | | | | Ge | 1.0 | O | 5.15 | 0.10 | 0.15 |
| Example 8 | La | 2.03 | | Si | 0.90 | Ge | 0.1 | O | 5.05 | 0.03 | 0.05 |
| Example 9 | La | 2.10 | | Si | 1.00 | | | O | 5.15 | 0.10 | 0.15 |
| Example 10 | La | 2.04 | | Si | 1.00 | | | O | 5.06 | 0.04 | 0.06 |
| Example 11 | La | 2.05 | | Si | 1.00 | | | O | 5.08 | 0.05 | 0.08 |
| Example 12 | La | 2.05 | | Si | 1.00 | | | O | 5.08 | 0.05 | 0.08 |
| Example 13 | La | 2.01 | | Si | 1.00 | | | O | 5.02 | 0.01 | 0.02 |
| Example 14 | | | Nd | 2.00 | Si | 1.00 | | O | 5.00 | 0.00 | 0.00 |
| Example 15 | La | 1.85 | Nd | 0.20 | Si | 1.00 | | O | 5.08 | 0.05 | 0.08 |
| Example 16 | La | 1.03 | Nd | 1.00 | Si | 1.00 | | O | 5.05 | 0.03 | 0.05 |
| Example 17 | La | 1.85 | Ba | 0.20 | Si | 1.00 | | O | 4.98 | 0.05 | −0.02 |
| Example 18 | La | 1.82 | Sr | 0.20 | Si | 1.00 | | O | 4.93 | 0.02 | −0.07 |
| Example 19 | La | 1.85 | Ca | 0.20 | Si | 1.00 | | O | 4.98 | 0.05 | −0.02 |
| Example 20 | La | 1.88 | Ce | 0.20 | Si | 1.00 | | O | 5.11 | 0.08 | 0.22 |
| Comparative Example 1 | La | 2.05 | | Si | 1.00 | | | O | 5.08 | 0.05 | 0.08 |
| Comparative Example 2 | (Non-oriented apatite-type sintered body) | | | | | | | | | |
| Comparative Example 3 | (Diffusion couple method) | | | | | | | | | |
| Comparative Example 4 | (Strong magnetic field method) | | | | | | | | | |

| | $A_{9.33+x}[T_{6-y}M_y]O_{26.00+z}$ | | | | | | |
|---|---|---|---|---|---|---|---|
| | A | | T | | | M | |
| Example 1 | La | 9.83 | Si | 4.83 | | B | 1.17 |
| Example 2 | La | 9.90 | Si | 4.79 | | B | 1.21 |
| Example 3 | La | 9.98 | Si | 4.63 | | B | 1.37 |
| Example 4 | La | 10.02 | Si | 4.38 | | B | 1.62 |
| Example 5 | La | 9.39 | Si | 3.82 | | B | 2.18 |
| Example 6 | La | 9.34 | Si | 3.48 | | B | 2.52 |
| Example 7 | La | 9.90 | | | Ge | 4.76 | B | 1.24 |
| Example 8 | La | 9.81 | Si | 4.44 | Ge | 0.40 | B | 1.16 |
| Example 9 | La | 9.77 | Si | 4.65 | | Ge | 1.35 |
| Example 10 | La | 9.59 | Si | 4.70 | | Zn | 1.30 |

TABLE 1-continued

| | | | | | | | | | |
|---|---|---|---|---|---|---|---|---|---|
| Example 11 | La | 9.98 | | | Si | 4.85 | S | 1.15 | |
| Example 12 | La | 9.90 | | | Si | 4.94 | W | 1.06 | |
| Example 13 | La | 9.79 | | | Si | 4.94 | B | 0.95 | Mo 0.11 |
| Example 14 | | | Nd | 9.80 | Si | 4.79 | B | 1.21 | |
| Example 15 | La | 8.83 | Nd | 1.05 | Si | 4.71 | B | 1.29 | |
| Example 16 | La | 4.87 | Nd | 4.79 | Si | 4.63 | B | 1.37 | |
| Example 17 | La | 9.01 | Ba | 0.76 | Si | 4.73 | B | 1.27 | |
| Example 18 | La | 8.70 | Sr | 0.82 | Si | 4.88 | B | 1.12 | |
| Example 19 | La | 9.11 | Ca | 0.88 | Si | 4.78 | B | 1.22 | |
| Example 20 | La | 8.94 | Ce | 0.77 | Si | 4.93 | B | 1.07 | |
| Comparative Example 1 | — | | | | — | | — | | |
| Comparative Example 2 | La | 9.66 | | | Si | 6.00 | — | | |
| Comparative Example 3 | La | 9.70 | | | Si | 6.00 | — | | |
| Comparative Example 4 | La | 9.66 | | | Si | 6.00 | — | | |

| | $A_{9.33+x}[T_{6-y}M_y]O_{26.00+z}$ | | | | | Degree of orientation | Transportation number | Conductivity S/cm 500° C. | Presence or absence of cracks | Comprehensive evaluation |
|---|---|---|---|---|---|---|---|---|---|---|
| | O | x | y | z | A/M | | | | | |
| Example 1 | O | 26.16 | 0.50 | 1.17 | 0.16 | 8.43 | 0.95< | 0.96 | $3.0 \times 10^{-2}$ | Absence | ◉ |
| Example 2 | O | 26.24 | 0.57 | 1.21 | 0.24 | 8.19 | 0.95< | 0.96 | $2.5 \times 10^{-2}$ | Absence | ◉ |
| Example 3 | O | 26.28 | 0.65 | 1.37 | 0.28 | 7.30 | 0.95< | 0.95 | $3.5 \times 10^{-2}$ | Absence | ◉ |
| Example 4 | O | 26.23 | 0.69 | 1.62 | 0.23 | 6.20 | 0.91 | 0.96 | $8.8 \times 10^{-3}$ | Absence | ○ |
| Example 5 | O | 25.00 | 0.06 | 2.18 | −1.00 | 4.30 | 0.84 | 0.96 | $1.1 \times 10^{-3}$ | Absence | ○ |
| Example 6 | O | 24.75 | 0.01 | 2.52 | −1.25 | 3.70 | 0.81 | 0.95 | $9.7 \times 10^{-4}$ | Absence | ○ |
| Example 7 | O | 26.23 | 0.57 | 1.24 | 0.23 | 7.98 | 0.95< | 0.94 | $8.3 \times 10^{-3}$ | Absence | ○ |
| Example 8 | O | 26.14 | 0.48 | 1.16 | 0.14 | 8.47 | 0.95< | 0.95 | $1.9 \times 10^{-2}$ | Absence | ◉ |
| Example 9 | O | 26.65 | 0.44 | 1.35 | 0.65 | 7.23 | 0.95< | 0.95 | $1.9 \times 10^{-2}$ | Absence | ◉ |
| Example 10 | O | 25.08 | 0.26 | 1.30 | −0.92 | 7.38 | 0.81 | 0.95 | $4.7 \times 10^{-4}$ | Absence | ○ |
| Example 11 | O | 26.98 | 0.65 | 1.15 | 0.98 | 8.68 | 0.66 | 0.90 | $1.1 \times 10^{-4}$ | Absence | ○ |
| Example 12 | O | 27.91 | 0.57 | 1.06 | 1.91 | 9.34 | 0.79 | 0.87 | $2.7 \times 10^{-4}$ | Absence | ○ |
| Example 13 | O | 26.32 | 0.46 | 1.06 | 0.32 | 9.24 | 0.71 | 0.85 | $1.6 \times 10^{-4}$ | Absence | ○ |
| Example 14 | O | 26.10 | 0.47 | 1.21 | 0.10 | 8.10 | 0.95< | 0.95 | $9.0 \times 10^{-4}$ | Absence | ○ |
| Example 15 | O | 26.17 | 0.55 | 1.29 | 0.17 | 7.68 | 0.95< | 0.95 | $8.9 \times 10^{-3}$ | Absence | ○ |
| Example 16 | O | 25.81 | 0.33 | 1.37 | −0.19 | 7.05 | 0.95< | 0.95 | $7.5 \times 10^{-3}$ | Absence | ○ |
| Example 17 | O | 25.64 | 0.44 | 1.27 | −0.36 | 7.69 | 0.92 | 0.94 | $6.0 \times 10^{-3}$ | Absence | ○ |
| Example 18 | O | 25.31 | 0.19 | 1.12 | −0.69 | 8.50 | 0.94 | 0.93 | $9.4 \times 10^{-3}$ | Absence | ○ |
| Example 19 | O | 25.94 | 0.66 | 1.22 | −0.06 | 8.19 | 0.93 | 0.93 | $5.2 \times 10^{-3}$ | Absence | ○ |
| Example 20 | O | 26.42 | 0.38 | 1.07 | 0.42 | 9.07 | 0.90 | 0.93 | $4.8 \times 10^{-4}$ | Absence | ○ |
| Comparative Example 1 | — | — | — | — | — | — | — | — | — | — | X |
| Comparative Example 2 | O | 26.49 | 0.33 | — | 0.49 | — | <0.05 | 0.95 | $9.5 \times 10^{-5}$ | Absence | Δ |

TABLE 1-continued

| | | | | | | | | | | | |
|---|---|---|---|---|---|---|---|---|---|---|---|
| Comparative Example 3 | O | 26.55 | 0.37 | — | 0.55 | — | 0.95< | 0.96 | $2.0 \times 10^{-3}$ | Presence | X |
| Comparative Example 4 | O | 26.49 | 0.33 | — | 0.49 | — | 0.81 | 0.95 | $8.8 \times 10^{-5}$ | Absence | Δ |

DISCUSSION

From Examples described above and the results of the tests which have been so far conducted by the inventors, it has been found that the oriented apatite-type oxide ion conductor composed of a composite oxide represented by $A_{9.33+x}[T_{6-y}M_y]O_{26.00+z}$ (A in the formula is one kind or two or more kinds of elements selected from the group consisting of La, Ce, Pr, Nd, Sm, Eu, Gd, Tb, Dy, Be, Mg, Ca, Sr, and Ba. T in the formula is an element including Si, Ge, or both of them. M in the formula is one kind or two or more kinds of elements selected from the group consisting of B, Ge, Zn, Sn, W, and Mo.), in which x in the formula is from −1 to 1, y in the formula is from 1 to 3, z in the formula is from −2 to 2, and a ratio (A/M) of the number of moles of A to the number of moles of M is from 3 to 10 exhibits high oxygen ion conductivity.

In addition, from Examples described above and the results of the tests which have been so far conducted by the inventors, it has been found that it is possible to grow the oriented crystal of the oriented apatite-type oxide ion conductor in one direction and further to suppress the generation of cracks by heating a precursor represented by $A_{2+x}TO_{5+z}$ (A in the formula is one kind or two or more kinds of elements selected from the group consisting of La, Ce, Pr, Nd, Sm, Eu, Gd, Tb, Dy, Be, Mg, Ca, Sr, and Ba. T in the formula is an element including Si, Ge, or both of them. In the formula, x is from −1 to 1 and z is from −2 to 2.) in a gas phase containing an element M (M is one kind or two or more kinds of elements selected from the group consisting of B, Ge, Zn, Sn, W, and Mo).

The invention claimed is:

1. An oriented apatite-type oxide ion conductor comprising a composite oxide represented by $A_{9.33+x}[T_{6-y}M_y]O_{26.00+z}$, wherein A in the formula is one kind or two or more kinds of elements selected from the group consisting of La, Ce, Pr, Nd, Sm, Eu, Gd, Tb, Dy, Be, Mg, Sr, and Ba, T in the formula is an element including Si, Ge, or both of them, M in the formula is one kind or two or more kinds of elements selected from the group consisting of B, Zn, Sn, W, and Mo, wherein
   x in the formula is from −1 to 1,
   y in the formula is from 1 to 3,
   z in the formula is from −2 to 2, and
   a ratio (A/M) of the number of moles of A to the number of moles of M is from 3 to 10,
   wherein said composite oxide has a degree of orientation measured by Lotgering method of 0.9 or more.

2. An electrode bonded body comprising a configuration obtained by laminating an electrode on both surfaces of the oriented apatite-type oxide ion conductor according to claim 1.

3. A method for manufacturing an oriented apatite-type oxide ion conductor, the method comprising a vapor phase-solid phase diffusion step of
   converting a precursor represented by $A_{2+x}TO_{5+z}$, wherein A in the formula is one kind or two or more kinds of elements selected from the group consisting of La, Ce, Pr, Nd, Sm, Eu, Gd, Tb, Dy, Be, Mg, Sr, and Ba, T in the formula is an element including Si, Ge, or both of them, x in the formula is from −1 to 1 and z is from −2 to 2, to have an apatite structure by heating the precursor in a gas phase containing an element M, wherein M is one kind or two or more kinds of elements selected from the group consisting of B, Ge, Zn, Sn, W, and Mo for a reaction of the precursor with the element M,
   wherein said oriented apatite-type oxide ion conductor comprising a composite oxide represented by $A_{9.33+x}[T_{6-y}M_y]O_{26.00+z}$, wherein A in the formula is one kind or two or more kinds of elements selected from the group consisting of La, Ce, Pr, Nd, Sm, Eu, Gd, Tb, Dy, Be, Mg, Sr, and Ba, T in the formula is an element including Si, Ge, or both of them, M in the formula is one kind or two or more kinds of elements selected from the group consisting of B, Ge, Zn, Sn, W, and Mo,
   wherein x in the formula is from −1 to 1,
   y in the formula is from 1 to 3,
   z in the formula is from −2 to 2, and
   a ratio (A/M) of the number of moles of A to the number of moles of M is from 3 to 10, and
   wherein said composite oxide has a degree of orientation measured by the Lotgering method is 0.9 or more.

4. The method for manufacturing an oriented apatite-type oxide ion conductor according to claim 3, wherein the precursor represented by $A_{2+x}TO_{5+z}$ is obtained by a manufacturing method including a step of heating a compound represented by the above formula $A_{2+x}TO_{5+z}$ at from 1100° C. to 1700° C. to sinter the compound.

5. The method for manufacturing an oriented apatite-type oxide ion conductor according to claim 3,
   wherein the precursor represented by $A_{2+x}TO_{5+z}$ is heated at from 1000° C. to 1700° C. in the gas phase containing the element M in the vapor phase-solid phase diffusion step.

6. The method for manufacturing an oriented apatite-type oxide ion conductor according to claim 5, wherein the precursor represented by $A_{2+x}TO_{5+z}$ is obtained by a manufacturing method including a step of heating a compound represented by the above formula $A_{2+x}TO_{5+z}$ at from 1100° C. to 1700° C. to sinter the compound.

7. The method for manufacturing an oriented apatite-type oxide ion conductor according to claim 3,
   wherein the precursor represented by $A_{2+x}TO_{5+z}$ and a compound containing the element M are placed in a container and heated to vaporize the compound containing the element M and thus to change an atmosphere in the container to a gas phase atmosphere containing the element M and the precursor is reacted with the element M in the vapor phase-solid phase diffusion step.

8. The method for manufacturing an oriented apatite-type oxide ion conductor according to claim 7,
   wherein the precursor represented by $A_{2+x}TO_{5+z}$ is heated at from 1000° C. to 1700° C. in the gas phase containing the element M in the vapor phase-solid phase diffusion step.

9. The method for manufacturing an oriented apatite-type oxide ion conductor according to claim 7, wherein the precursor represented by $A_{2+x}TO_{5+z}$ is obtained by a manufacturing method including a step of heating a compound represented by the above formula $A_{2+x}TO_{5+z}$ at from 1100° C. to 1700° C. to sinter the compound.

* * * * *